(12) United States Patent
Bissonnette

(10) Patent No.: US 9,505,033 B2
(45) Date of Patent: Nov. 29, 2016

(54) METHOD AND SYSTEM FOR PROCESSING AND RECYCLING INFILL MATERIAL OF ARTIFICIAL TURF

(71) Applicant: TARKETT INC., Farnham (CA)

(72) Inventor: Alain Bissonnette, Montreal (CA)

(73) Assignee: TARKETT INC., Farnham, Quebec (CA)

( * ) Notice: Subject to any disclaimer, the term of this patent is extended or adjusted under 35 U.S.C. 154(b) by 0 days.

(21) Appl. No.: 14/608,049

(22) Filed: Jan. 28, 2015

(65) Prior Publication Data

US 2015/0209830 A1 Jul. 30, 2015

Related U.S. Application Data

(60) Provisional application No. 61/933,249, filed on Jan. 29, 2014, provisional application No. 61/954,266, filed on Mar. 17, 2014.

(51) Int. Cl.
| | | |
|---|---|---|
| *B03B 7/00* | (2006.01) | |
| *B07B 4/08* | (2006.01) | |
| *B07B 9/00* | (2006.01) | |
| *F26B 3/08* | (2006.01) | |
| *B29B 17/02* | (2006.01) | |
| *B07B 4/02* | (2006.01) | |
| *B29L 31/00* | (2006.01) | |

(52) U.S. Cl.
CPC . *B07B 4/08* (2013.01); *B07B 9/00* (2013.01); *B29B 17/02* (2013.01); *F26B 3/08* (2013.01); *B07B 4/02* (2013.01); *B07B 2201/04* (2013.01); *B29B 2017/0224* (2013.01); *B29B 2017/0231* (2013.01); *B29L 2031/732* (2013.01); *Y02W 30/523* (2015.05); *Y02W 30/622* (2015.05); *Y02W 30/68* (2015.05)

(58) Field of Classification Search
CPC .............. B07B 4/02; B07B 4/08; B07B 9/00
USPC ....................................... 209/12.1, 20, 22, 23
See application file for complete search history.

(56) References Cited

U.S. PATENT DOCUMENTS

| 5,084,135 A | 1/1992 | Brooks et al. |
| 5,358,119 A | 10/1994 | Stahl et al. |

(Continued)

FOREIGN PATENT DOCUMENTS

| CA | 2094035 C | 9/2003 |
| CA | 2094141 C | 9/2003 |

OTHER PUBLICATIONS

International Search Report and Written Opinion, PCT/CA2015/000053, mailed May 1, 2015.

*Primary Examiner* — Terrell Matthews
(74) *Attorney, Agent, or Firm* — Winston & Strawn LLP

(57) ABSTRACT

A method and system for processing and recycling infill material of artificial turf. The invention includes drying extracted infill material through a fluid bed dryer, the fluid bed dryer passes a process gas through a bed of solids via a perforated plate. The dried infill material is processed using a plurality of vibrating screens to remove excessively large or small particles from the infill material. The plurality of vibrating screens may be a set of progressively finer mesh screens. The processed infill material is separated by density. The density of the infill material may be determined by a high intensity, uniform sheet of laminar airflow. The separated infill material is discharged and is ready to be used again in another artificial turf. In one embodiment, the infill material includes at least one of graded sand, granulated styrene-butadiene rubber, cork, organic infill, thermoplastic elastomers, or ethylene propylene diene monomers.

13 Claims, 7 Drawing Sheets

(56) References Cited

U.S. PATENT DOCUMENTS

| | | |
|---|---|---|
| 5,366,091 A | 11/1994 | Stahl et al. |
| 9,045,071 B2 * | 6/2015 | Nicholls ............... B60P 3/14 |
| 9,205,460 B2 * | 12/2015 | Andersen ............... B07B 9/02 |
| 2013/0280445 A1 * | 10/2013 | McAnany ............... E01C 13/08 428/17 |
| 2014/0265011 A1 * | 9/2014 | Mashburn ............... B09B 3/00 264/176.1 |

\* cited by examiner

METHOD AND SYSTEM FOR PROCESSING AND RECYCLING INFILL MATERIAL OF ARTIFICIAL TURF

PRIORITY

This application claims priority to provisional application No. 61/933,249, filed on Jan. 29, 2014, and provisional application No. 61/954,266, filed on Mar. 17, 2014, the entirety of both are incorporated herein by reference.

FIELD OF THE INVENTION

The present invention relates to processing and recycling infill material of artificial turf. The invention is, more specifically, a process of drying, processing, cleaning, separating and discharging extracted infill material for reuse.

BACKGROUND

Synthetic or artificial turf is used for a variety of different applications. Since the mid-nineties, long-pile artificial turf (also referred to as third generation or 3G) surfaces have been used for contact sports, such as American Football, Soccer, Lacrosse etc. The evolution of the term 3G refers to long tufted fibers that are tufted into a primary backing medium and then coated with a material such as Polyurethane (PU) or latex in order to secure the fibers in place. The long fibers are then supported/interspersed by an infill medium(s), which provide a balance of product stability and cushioning.

The most common infill medium for stability is graded sand, while the most common material for cushioning or performance is granulated styrene-butadiene rubber (SBR) or the material used for manufacturing car tires. However, other materials can be used, such as Thermoplastic Elastomers (TPE's) and Ethylene Propylene Diene Monomers (EPDM's). The infill material can also include cork and organic infill. The infill material can be used in isolation or combined together either in distinct layers or by mixing together. The typical sand/rubber infill material of an elite level turf system can represent around 900,000 lbs. of material, which is greater than 90% of the overall turf system weight. The infill material may also have a monetary value, which depends on the material type, quality, quantity etc.

Over the lifetime of the field (which can typically be anywhere between 8-15 years), the infill is subject to a very harsh environment, such as ultraviolet light, rain, mechanical wear, extreme temperatures, etc., which can cause the materials to breakdown into finer particles. It is also known that the infill can become contaminated by broken fiber fragments or shards, as well as from detritus, such as rotting leaves, dust, stones, etc.

High levels of fine particles can lead to poor drainage of the turf, whilst foreign material within the infill material, such as stones and metals, can pose a safety risk. Further, broken fiber and other foreign material is unsightly and can detract from the overall appearance of the field.

When recycling or replacing infill material that has reached the end of its life cycle, it would be efficient and environmentally beneficial if the infill material could be recycled or reused. In addition to saving on the cost of purchasing and shipping in new infill, the 'old' infill would also be diverted from a landfill.

SUMMARY OF THE INVENTION

In accordance with principles of one embodiment of the present invention, systems, and methods are provided to process and recycle infill material of artificial turf.

One aspect of the invention disclosed and claimed herein comprises a method and system for processing and recycling infill material of artificial turf. The method comprises drying extracted infill material through a fluid bed dryer or cooler. Fluid bed dryers are designed to dry and/or cool a variety of products at a wide variation of feed rates. The method also comprises processing the dried infill material using a vibrating screen to remove any excessively large or small particles. The fluid bed dryer may also be a vibrating fluid bed liner that while drying and/or cooling the infill material, it is processing the infill material to remove any excessively large or small particles. An air knife may also be used in order to further separate the infill material by density, which uses suction or a vacuum to remove the finer or less dense material. The method further comprises separating the infill material by density and discharging the clean and separated infill material, which is ready to be used again. In another embodiment, the density of the infill material is determined by a high intensity, uniform sheet of laminar airflow. In yet another embodiment, the infill material is cascaded vertically and exposed to the high intensity, uniform sheet of laminar airflow or suction. In one embodiment, the extracted infill material is loaded into a bulk hopper and then fed into the fluid bed dryer. In another embodiment, the extracted infill material is transported to the fluid bed dryer via a conveyor belt system. In one embodiment, the extracted infill material includes at least one of graded sand, granulated styrene-butadiene rubber, thermoplastic elastomers, or ethylene propylene diene monomers.

Another aspect of the invention disclosed and claimed herein comprises a method for processing and recycling infill material of artificial turf. The method comprises drying extracted infill material through a fluid bed dryer, the fluid bed dryer passes a process gas through a bed of solids via perforated plate. The method also comprises processing the dried infill material using a plurality of vibrating screens to remove any excessively large or small particles from the infill material, wherein the plurality of vibrating screens are a set of progressively finer mesh screens. The method also comprises separating the infill material by density and discharging the clean and separated infill material, which is ready to be used again. In one embodiment, the progressively finer mesh screens are positioned with the biggest mesh screen on top and the smallest mesh screen on the bottom. In another embodiment, the biggest mesh screen is a #10 mesh screen and the smallest mesh screen is a #45 mesh screen. In another embodiment, the biggest mesh screen is a #4 mesh screen and the smallest mesh screen is a #400 mesh screen. It should be appreciated that these screen sizes are examples and the invention is not limited to only these examples. In another embodiment, the equipment includes a single vibrating screen that separates the unwanted larger material and fiber shards from the good material. In yet another embodiment, the plurality of vibrating screens includes three screens that separate the infill material into three categories: good material, oversize material, and undersize material.

Another aspect of the invention disclosed and claimed herein comprises a system for processing and recycling infill material of artificial turf. The system comprises a drying component that includes a fluid bed dryer and is configured to dry extracted infill material. The fluid bed dryer passes a process gas through a bed of solids via a perforated plate. Dried material is then discharged from the fluid bed and into a screening component. The screening component includes a plurality of vibrating screens that are configured to remove any excessively large or small particles from the dried infill material, wherein the plurality of vibrating screens are a set of progressively finer mesh screens. The vibrating screens separate the infill material into good (wanted) material and bad (unwanted) material. The bad material may be bagged for disposal or reprocessing. The system also comprises a separation component that is configured to separate the infill material by density using an air knife as described above. This equipment would typically be mounted in-line at the end of the screening component. The system also comprises at least two discharge components including a useable material component for wanted infill material and an unusable material discharge component for material that is not reuseable. The useable material is transported and then discharged into bags to be used again and the unuseable material is transported and then discharged to be ready for disposal. The two discharge components are part of the screening and separation components. In another embodiment, the unusable material may be removed from the fluid bed dryer via a bag house or extraction system. In one embodiment, the components are individual pieces of equipment that are capable of being connected in a variety of combinations via one or more conveyor belts. In another embodiment, the components are capable of being connected via a screw feeder, where the feeding of the material is performed at a consistent, steady rate. In yet another embodiment, the components are portable and capable of individually being mounted on skids for transport on flat-bed trucks or other similar transportation means. Each piece of equipment or component may be mounted individually on a metal skid or frame to make loading, unloading and set up easier. This may allow shipment by any number of shipping companies. Alternatively, it could all be permanently mounted on pre-purchased trailers or flat beds and all of the units would be shipped from field to field as needed.

BRIEF DESCRIPTION OF THE DRAWINGS

Figure 1:
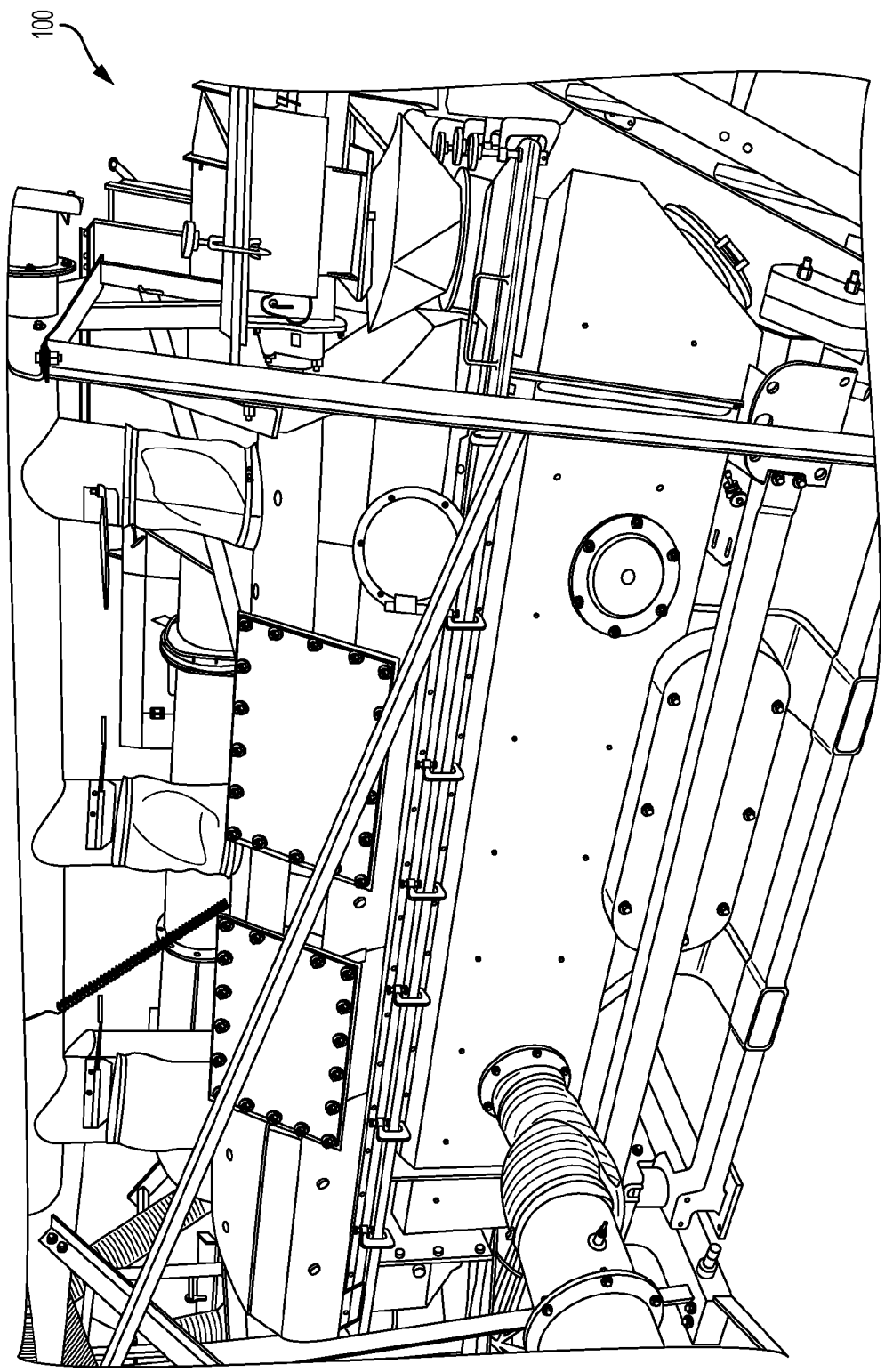
Figure 2:
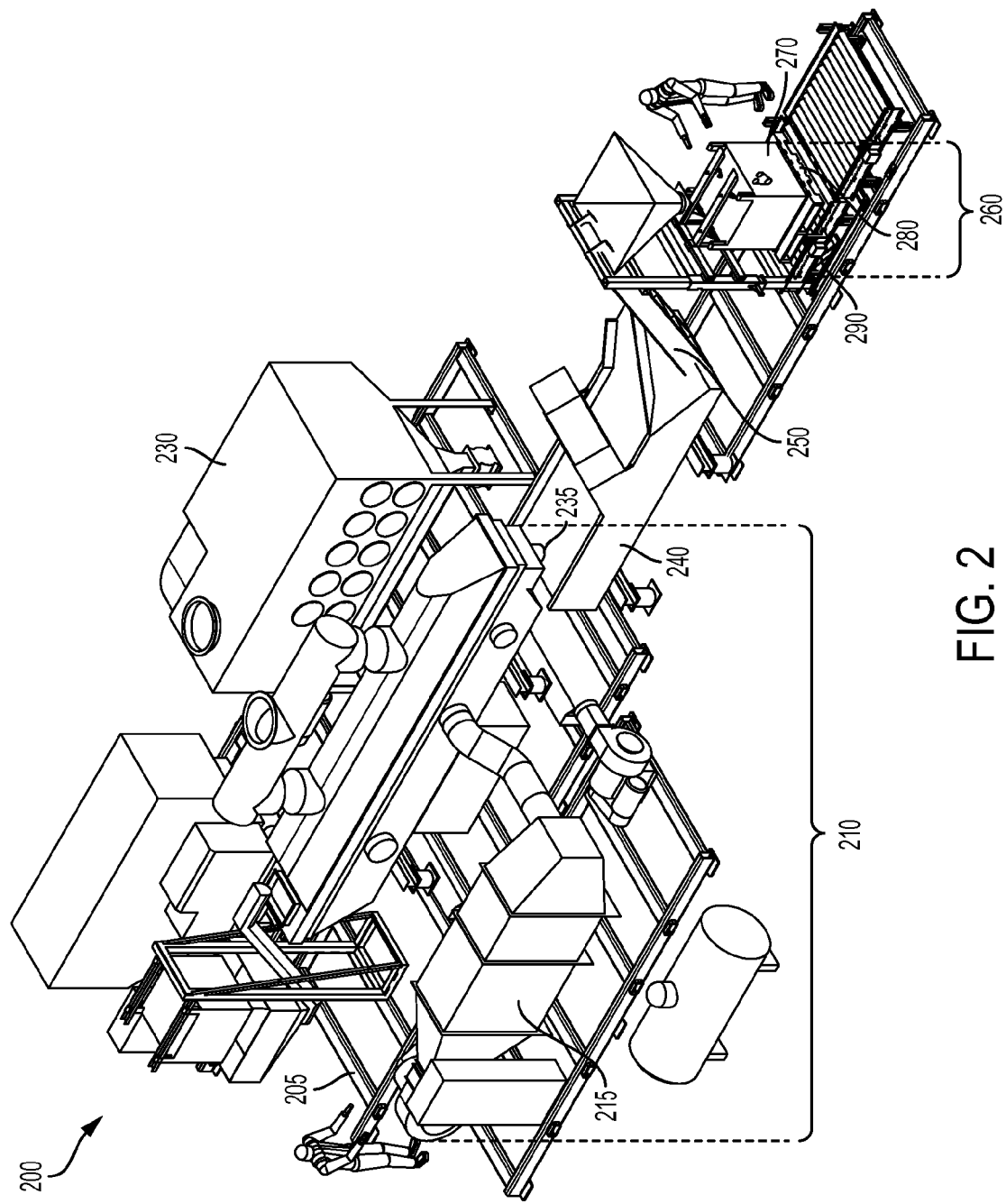
Figure 3:
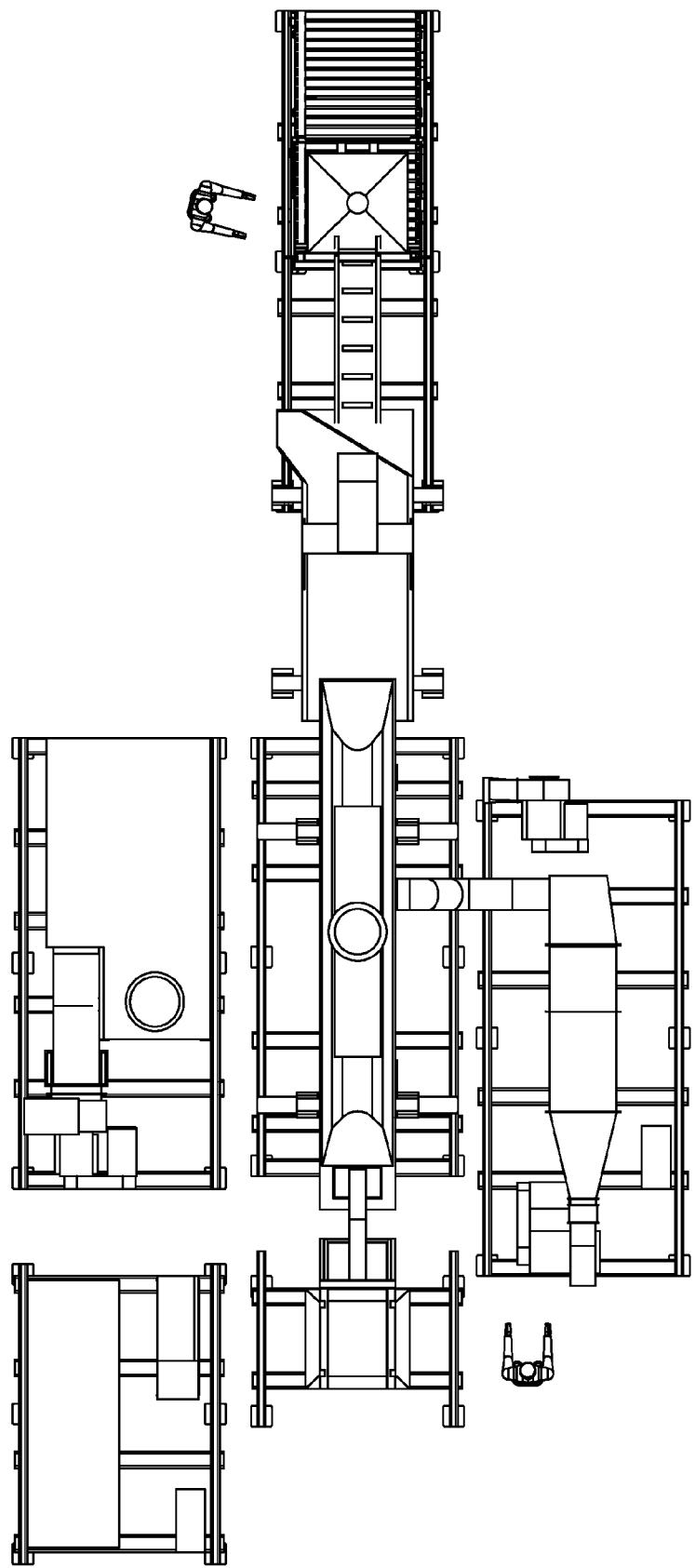
Figure 4:
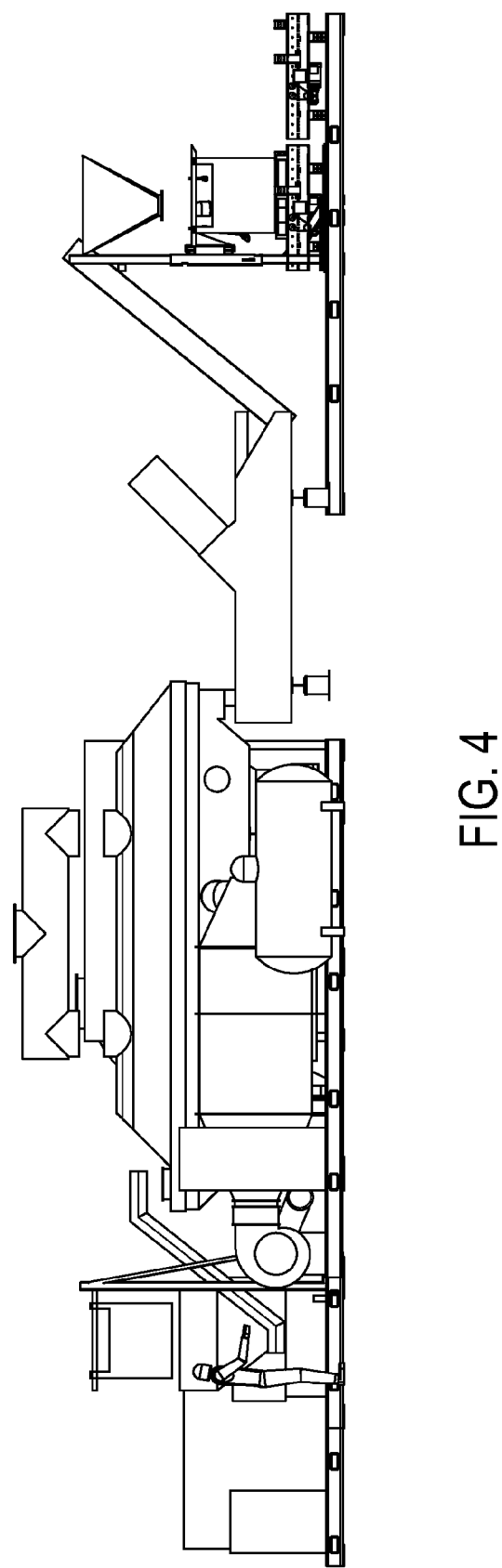
Figure 5:
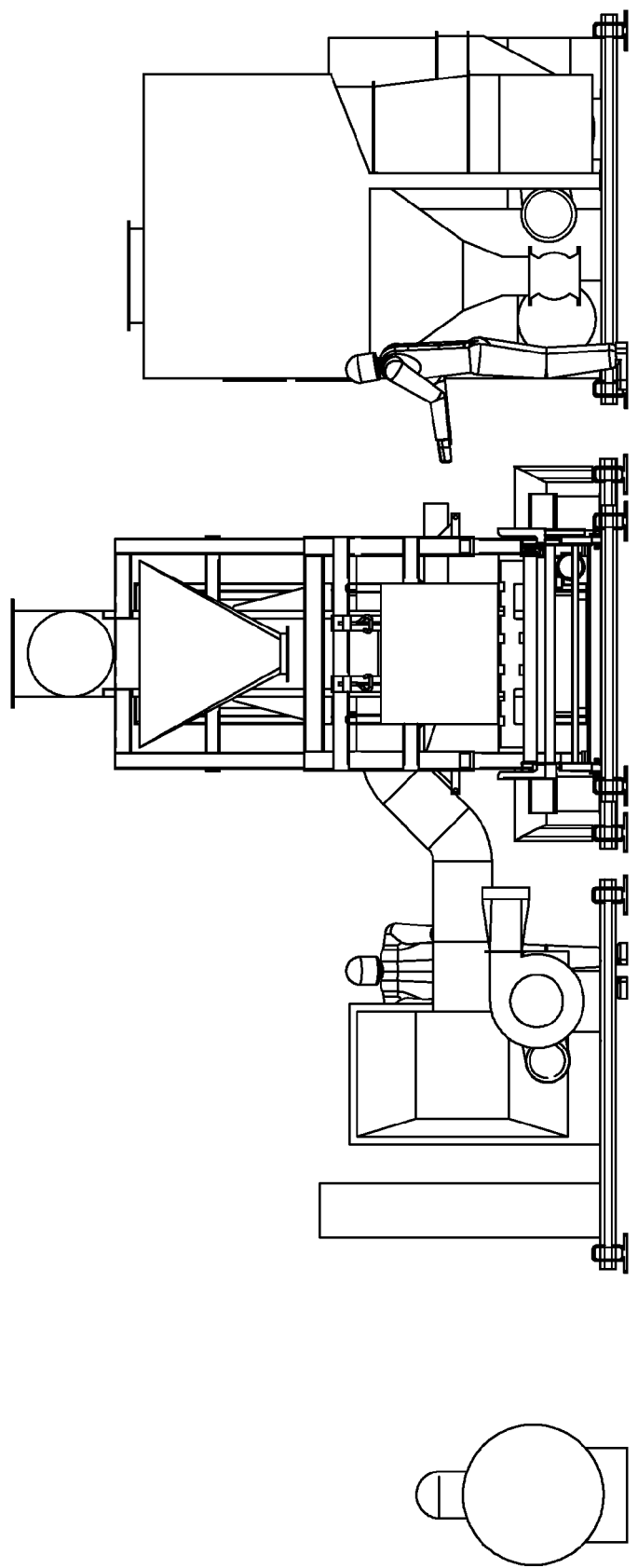
Figure 6:
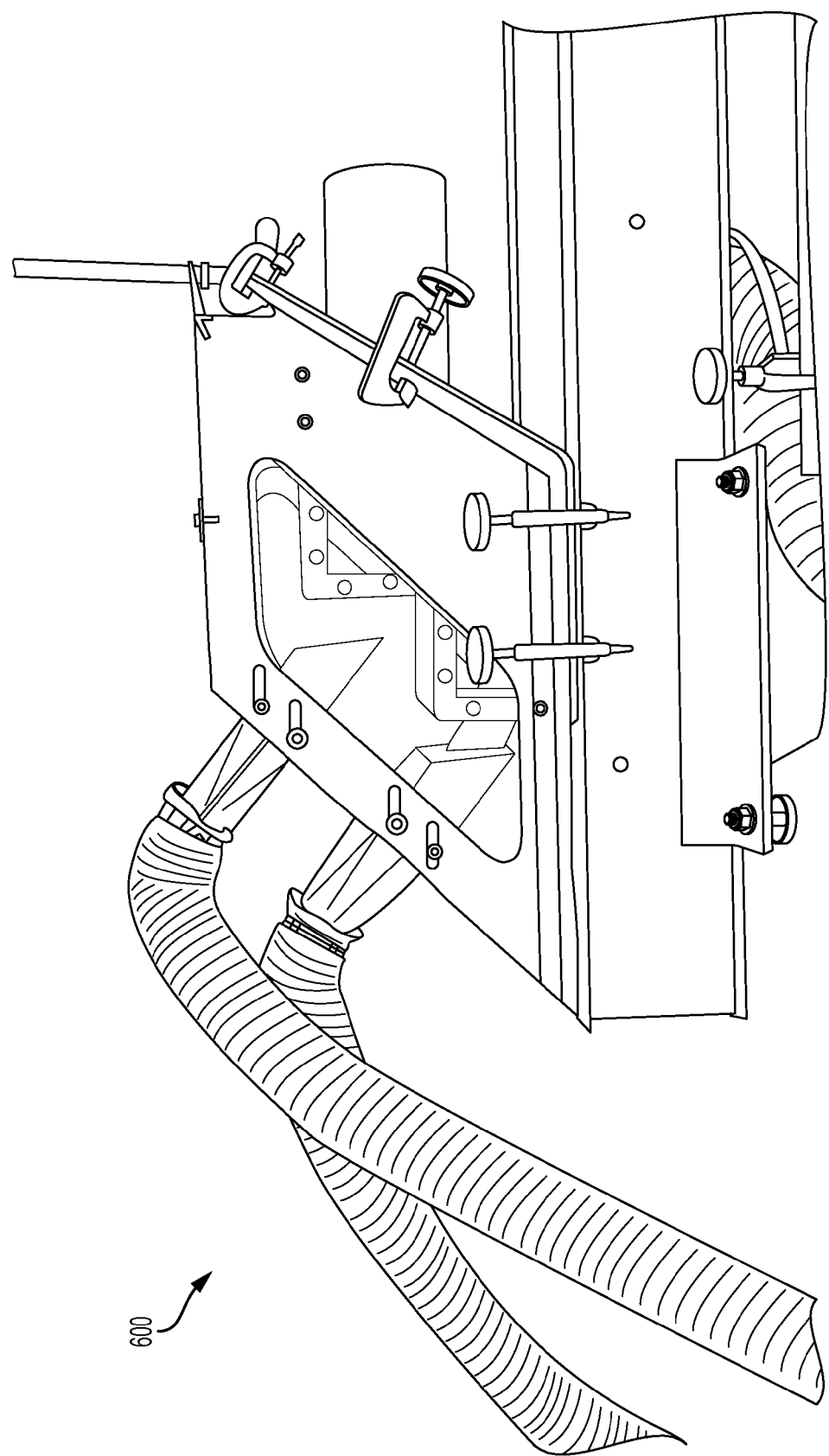
Figure 7:
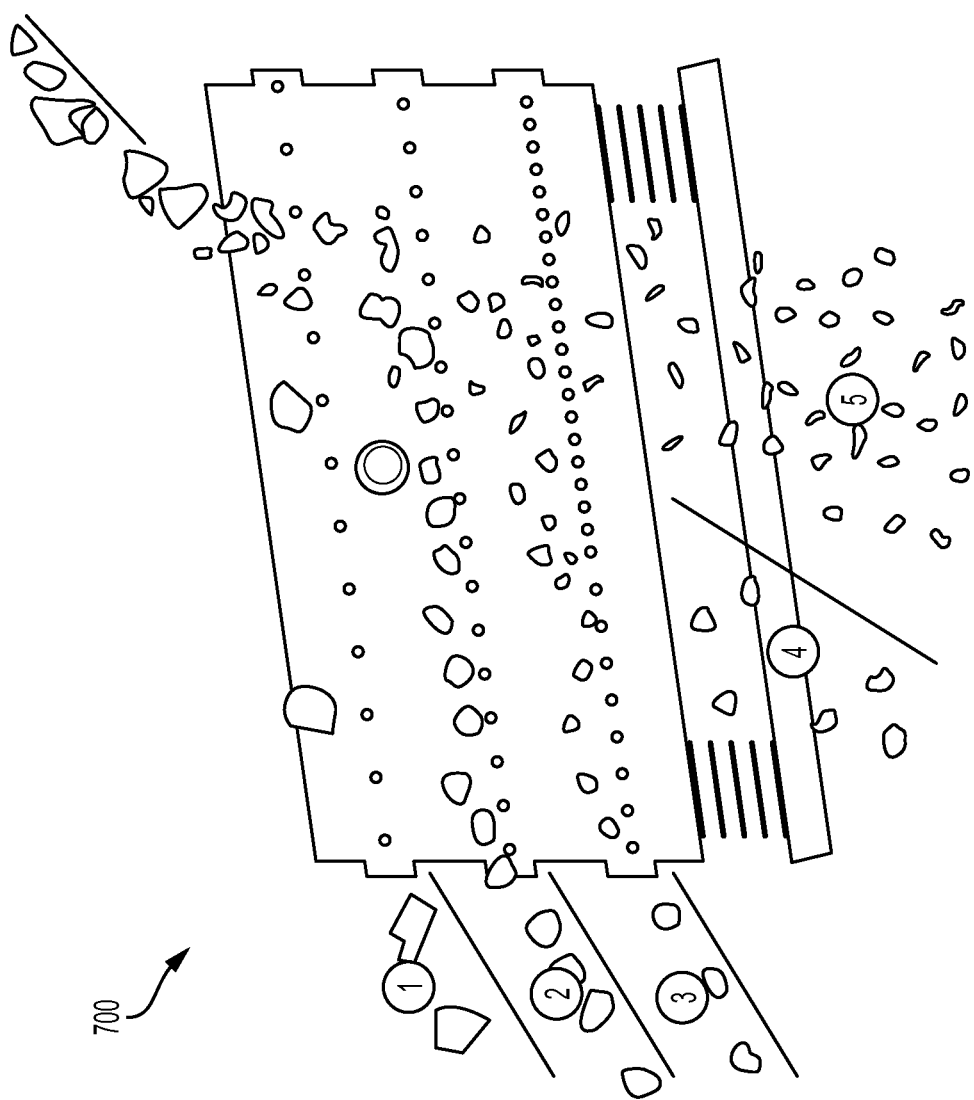

Having thus described preferred and exemplary embodiments of the present invention in general terms, reference will now be made to the accompanying drawings, which are not necessarily drawn to scale, and wherein:

FIG. 1 illustrates an exemplary fluid bed dryer, in accordance with one embodiment of the present invention;

FIG. 2 is an illustration of a possible assembly of the components together, in accordance with one embodiment of the present invention;

FIG. 3 is an aerial view of the possible assembly of FIG. 2, in accordance with one embodiment of the present invention;

FIG. 4 is a different view of the illustration of the possible assembly of FIG. 2, in accordance with one embodiment of the present invention;

FIG. 5 is another different view of the illustration of the possible assembly of FIG. 2, in accordance with one embodiment of the present invention;

FIG. 6 is an illustration of an air knife of the separation component, in accordance with one embodiment of the present invention; and FIG. 7 is an illustration of one or more vibrating screens of the screening component, in accordance with one embodiment of the present invention.

DETAILED DESCRIPTION

Preferred embodiments of the present invention now will be described more fully hereinafter with reference to the accompanying drawings. The present invention can, however, be embodied in many different forms and should not be construed as limited to the preferred embodiments set forth herein; rather, these preferred embodiments are provided so that this disclosure will be thorough and complete, and will fully convey the scope of the invention to those skilled in the art. The present invention may be implemented with different combinations of hardware. It will be appreciated by those skilled in the art that changes could be made to the embodiments described herein without departing from the broad inventive concept thereof. It is understood, therefore, that this invention is not limited to the particular examples disclosed, but it is intended to cover modifications within the spirit and scope of the present invention as defined by the appended claims.

In order to recycle the infill material, the material must first be processed in order to remove the unwanted material. An additional challenge can exist by the material being wet, which makes processing such as screening and separating difficult. Processes and systems can be implemented to dry the material. This is where the Mobile Infill Recycling Technology/Process would come in.

The system may include a set of equipment or components that can be moved from field to field in order to perform the infill processing and recycling directly on site. This eliminates the need to ship infill from place to place, which can be very expensive because of its volume and sheer quantity. The system may include a series of units or components that connect directly to one another or via a conveyor belt system with each unit performing a specific task. These units may be weatherproof and may be mounted on metal skids, making it easy to load and unload from the transportation means, such as a trailer. The various units or components may be loaded onto flat-bed trucks (or similar) and then deployed to any field. Once on site, the skids may be unloaded, the units connected together and the infill processed. Once complete, the infill could be re-installed in the new field and the equipment could be shipped to another location. The processing and recycling of the infill material may include five key stages before it can be reused again: material in-feed, drying, screening (or cleaning), separation and discharging/bagging of fully processed, cleaned material.

Historically, infill material and aggregate material, such as sand or asphalt, have been dried in rotating drums that are heated by a large propane or liquefied petroleum gas flame at one end. These units are typically very large (larger than 40 feet long), inefficient, and difficult to adjust and require a large British Thermal Unit (BTU) in order to dry the material, thus making the operation somewhat expensive and inflexible.

Referring to FIG. 1, which illustrates an exemplary fluid bed dryer 100, in accordance with one embodiment of the present invention. The infill material is first extracted from the existing artificial turf. This may be executed in many different methods. The extracted infill would be consolidated into bulk bags, or perhaps a large pile, and then made ready for transportation to the drying component. In a preferred embodiment, the drying component is a fluid bed dryer 100 but other drying methods may also be considered. Fluid bed dryers are designed to dry and/or cool a variety of products at a wide variation of feed rates. Like conventional fluid bed processors, vibrating fluid bed dryers function by passing a process gas directly through a bed of solids via a perforated plate or another type of fluidizing media. Vibration is added to aid in fluidization of more difficult to fluidize materials. Vibrating fluid bed dryers are well suited for several different applications. These applications include processing of material that has a wide particle size distribution as the vibration may help to discharge oversize particles that will not fluidize, processing of sluggish or sticky materials, processing of temperature sensitive materials as a sub-fluidized condition may be created to produce plug flow and eliminate burning or discoloration of individual particles, and processing of fragile materials. Low amplitude vibration and reduced fluidizing velocity create a gentle bed, which causes less degradation than conventional fluid beds or other mechanical dryers.

The extracted infill material would first be loaded into a bulk hopper or bag and would then be fed into the fluid bed. This may be represented by a gravity feed system directly out of bulk bags, although the infill material could just as easily be transported to the unit via a conveyor belt system. As the fluid bed is fully enclosed, the BTU required to heat and dry the material are much lower than rotary kilns. Further, the fluidized state of the infill material means the dwell time or exposure to heat is much higher (even if the unit is relatively short), meaning it is quicker and more efficient. Finally, the fluid bed dryer 100 may use negative pressure, which makes it possible to extract smaller particles. The smaller material may include fine material and fiber, which is extracted via an extraction system, such as a with a cyclone or bag-house.

Now referring to FIG. 2, is an illustration of a possible assembly 200 of the components together, in accordance with one embodiment of the present invention. An example of the process that the assembly 200 illustrated in FIG. 2 may execute is described herein. From left to right the bulk extracted or old infill material is fed into a hopper or an infeed section 205. This can be done by either discharging a bulk bag or super-sack, or by way of a vehicle, such as a Bobcat. Then the infill material is transported from the infeed section 205 to the fluid bed dryer 210 by means of a conveyor belt system or a screw conveyor in order to maintain a constant and consistent flow of material into the equipment. The old material enters the fluid bed, which is heated by a gas heating unit 215. The heating unit 215 is located on the near side of FIG. 2. The heat in this example uses vaporized propane and is regulated by a baffle at the exit of the fluid bed. For example, the heating level is designed to dry the material to a set level and, therefore, if the infill material is more dry then less heat will be required and vice versa. The fluid bed dryer 210 may include a drying and a cooling section.

The hood of the fluid bed dryer 210 may be connected to a bag-house or a dust collector 230. The fluid bed operates with negative pressure so that the small material (e.g., fines, fiber, etc.) are pulled out of the top of the fluid bed and into the bag-house 230. This material may be collected and later removed for disposal. In order to remove any excessively large or small particles from the old infill, such as dust, detritus, stones, metal, etc., upon exit 235 from the fluid bed dryer 210, the dried infill material would be transported to a vibrating mesh screen deck 240 that contains a plurality of screens. Essentially the dried infill material enters the top of the deck 240, which is set up as a series of progressively finer mesh screens (biggest mesh on top, smallest on bottom). The screens may then separate the material based on size into 3 grades —good material, oversize material and undersize material. The grades required would be predetermined and are a direct result of the screen mesh sizes being used. Examples of the size of screens include, but are not limited to, nominally in the range of #10 (2 mm) to #45 (0.354 mm) mesh. However, these screens could range from #4 (4.75 mm) all the way to a #400 (0.037 mm) mesh. The idea of using #10 and #45 in this instance is that it leaves the bulk of the infill material in place and only removes particles at the extreme upper and lower end of the infill material mix particle size distribution. For example, the largest screen (for example, #10 mesh), would take out most (if not all) of the material that was larger than 2 mm (#10 mesh) in size. This would most likely be the oversized material. The next screen (for example, #45 mesh) would then capture all material passing through the #10 mesh that was smaller than 2 mm (#10) but bigger than 0.354 mm (#45). This would be the good material that may be retained for reuse. Anything that passed through the #45 mesh screen would be classed as undersized, such as fines materials, dust, etc., and could be deemed as being detrimental to performance (e.g., compaction, drainage, unsightly etc.). Depending on the cleanliness of the material, a single screen could be used, such as a #10 mesh, to simply remove the oversized material. All material passing through the #10 screen would be then be subjected to density separation via the air knives or the separation component. FIG. 3 is an aerial view of the possible assembly 200 of FIG. 2, in accordance with one embodiment of the present invention.

FIG. 4 is a different view of the illustration of the possible assembly 200 of FIG. 2, in accordance with one embodiment of the present invention. FIG. 5 is another different view of the illustration of the possible assembly 200 of FIG. 2, in accordance with one embodiment of the present invention.

Now referring to FIG. 7, which is an illustration of a vibrating screens of the screening component 700 (or 240 in FIG. 2), in accordance with one embodiment of the present invention. Upon exit from the screening component 700, the remaining infill material may now be transported to a separation component (260 in FIG. 2) by way of a conveyor belt system, a bucket elevator, etc. (250 in FIG. 2), and the remaining fine material and fiber may be separated. FIG. 6 is an illustration of an air knife 600 of the separation component (260 in FIG. 2), in accordance with one embodiment of the present invention. In one embodiment, the dried material may be vertically cascaded over something like an air knife or a high intensity, uniform sheet of laminar airflow, which would separate the infill material by way of density, e.g., light material and dense material. In another embodiment, an air knife uses suction or a vacuum to remove the lighter particles from the more dense particles. The dense material may be considered the good or reusable material and the light material may be considered the fines, which includes fibers and dust, and determined to be unwanted material for the purpose of recycled infill material.

The good material may be deposited into a bulk bag as shown by 270 in FIG. 2. Each bulk bag 270 that is filled with good material may be suspended on hooks and may be placed on a wooden skid 280. The skid may sit upon an automatic weighing scale 290 in order to allow for the monitoring of the weight per bulk bag. The system may include an automatic shut off of the flow of infill material when a bulk bag 270 reaches a predetermined weight. A generator may be used to power the fluid bed dryer, bag-house, vibrating screens, control system, fans, and the air knife, etc.

One or more features illustratively described herein can be implemented individually or in various combinations. It will be understood by those of ordinary skill in the art that described components, or modules are related to descriptions herein when the descriptions are directed to the same or related features of the component, or module.

Features or characteristics described in one context, process, or device are applicable to other context, process or devices described herein. The steps of the processes illustratively described herein can be performed in a different order, if desired. Also, steps could be added or removed from the processes illustratively described herein. In general, the use of "may" or "can" indicates that this one implementation, but technology is not limited just to this one implementation.

It would be understood that it is within contemplation that different feature, steps, or processes can be combined to arrive at new inventions.

Systems and methods described herein are particularly suited for processing and recycling infill material for artificial turf but it is possible to use the systems and methods described to help with the processing and recycling of other similar materials or purposes. The terms and expressions which have been employed in the specification are used as terms of description and not of limitations, there is no intention in the use of such terms and expressions to exclude any equivalents of the features shown and described or portions thereof, but it is recognized that various modifications are possible within the scope of the claims to the invention.

What is claimed is:

1. A method for processing and recycling infill material of artificial turf, the method comprising:
    drying extracted infill material through a fluid bed dryer;
    processing the dried infill material using a vibrating screen to remove excessively large or small particles or unwanted matter;
    separating the processed infill material by density; and
    discharging the separated infill material.

2. The method of claim 1, wherein the extracted infill material is loaded into a bulk hopper or bag and then fed into the fluid bed dryer.

3. The method of claim 1, wherein the extracted infill material is transported to the fluid bed dryer via a conveyor system.

4. The method of claim 1, wherein the density of the infill material is determined by a high intensity, uniform sheet of laminar airflow.

5. The method of claim 4, wherein the infill material is cascaded vertically and exposed to the high intensity, uniform sheet of laminar airflow or suction.

6. The method of claim 1, wherein the extracted infill material includes at least one of graded sand, granulated styrene-butadiene rubber, cork, organic infill, thermoplastic elastomers, or ethylene propylene diene monomers.

7. A method for processing and recycling infill material of artificial turf, the method comprising:
    drying extracted infill material through a fluid bed dryer, the fluid bed dryer passes a process gas through a bed of solids via a perforated plate;
    processing the dried infill material using one or more vibrating screens to remove excessively large or small particles or unwanted matter from the infill material, wherein the one or more vibrating screens are a set of progressively finer mesh screens;
    separating the processed infill material by density; and
    discharging the separated infill material.

8. The method of claim 7, wherein the progressively finer mesh screens are positioned with the biggest mesh screen on top and the smallest mesh screen on the bottom.

9. The method of claim 8, wherein the biggest mesh screen is a #4 mesh screen and smallest mesh screen is a #400 mesh screen.

10. The method of claim 7, wherein the one or more vibrating screens include three screens that separate the infill material into three categories: good material, oversize material, and undersize material.

11. A system for on-site processing and recycling infill material of artificial turf, the system comprising:
    a drying component including a fluid bed dryer configured to dry extracted infill material, the fluid bed dryer passes a process gas through a bed of solids via a perforated plate;
    a screening component including one or more vibrating screens configured to remove excessively large or small particles from the dried infill material, wherein the one or more vibrating screens are a set of progressively finer mesh screens;
    a separation component configured to separate the infill material by density using a high intensity, uniform sheet of laminar airflow, the separation component being mounted in-line at the end of the screening component; and
    at least two discharge components including a useable material discharge component for useable infill material and a unusable material discharge component for unuseable infill material, wherein the useable material discharge component transports the useable infill material to be used again and the unusable material discharge component transports the unusable infill material for disposal, and wherein the two discharge components are part of the screening component and the separation component.

12. The system of claim 11, wherein the components are individual pieces of equipment that are capable of being connected in a variety of combinations via one or more conveyor belts.

13. The system of claim 11, wherein the components are portable and capable of individually being mounted on skids for transport on flat-bed trucks or other similar transportation means.

* * * * *